L. R. EVANS.
SADDLE.
APPLICATION FILED MAR. 1, 1920.

1,373,718.

Patented Apr. 5, 1921.

INVENTOR.
Leigh R. Evans,
by Parker & Crochow,
ATTORNEYS.

UNITED STATES PATENT OFFICE.

LEIGH R. EVANS, OF ROCHESTER, NEW YORK, ASSIGNOR TO CYCLEMOTOR CORPORATION, OF ROCHESTER, NEW YORK.

SADDLE.

1,373,718.  Specification of Letters Patent.  Patented Apr. 5, 1921.

Application filed March 1, 1920. Serial No. 362,546.

*To all whom it may concern:*

Be it known that I, LEIGH R. EVANS, a citizen of the United States, residing at Rochester, in the county of Genesee and State of New York, have invented a new and useful Improvement in Saddles, of which the following is a specification.

This invention relates to saddles of the kind used on bicycles, motorcycles or the like, and more particularly to saddles of this kind which have a yielding or spring connection with the bicycle or motorcycle frame.

In saddles of this kind as heretofore made, it was necessary to provide springs of different strengths or resiliency so that the saddles could be adapted for persons of different weight by providing the saddle with a spring or springs having the desired resiliency, depending upon the weight of the person using the saddle.

The objects of this invention are to produce a saddle of this kind, which is adjustable so that the saddle may be made to yield more or less readily without changing the springs; also to improve devices of this kind in other respects herein specified.

A represents a portion of the frame of a motorcycle, bicycle or other vehicle, having upper frame members $a$ to which a saddle B is attached. The saddle B may be of any suitable or desirable construction, being provided as usual with a padded seat portion, and the rear portion thereof is preferably supported from the frame members through the medium of a cushioning spring. In the construction shown for this purpose, a rod or member C of substantially inverted U-shape is secured at its upper end to the lower face of the saddle, preferably by means of clamps or shackles $c$ which permit the U-shaped member C to swing relatively to the saddle. The two side portions of the U-shaped member constitute links which are connected at their lower ends to a pair of coil springs D, the lower ends of the side portions being preferably threaded and secured to eyes $d$ formed in the lower ends of the springs by means of nuts or the like. The upper ends of the springs may be connected to the frame by the cycle by any suitable means, a bolt or rod E being shown in the construction illustrated, which is held by suitable clamp members $e$ on the frame of the cycle. The bolt E preferably extends through spacing tubes $e'$ $e^2$, which properly space the springs relatively to the frame. Any other means may be provided for forming a spring connection between the rear portion of the saddle and the frame of the cycle.

The front portion of the saddle is supported from the frame by means of the usual leaf spring F, the front edge of which is usually provided with an eye which is pivoted on a clamp $f$ secured to the frame. The other end of the front spring is rigidly secured to the front portion of the saddle, a bolt $f'$ being employed in the construction shown, which is secured to the saddle and extends through a hole in the front spring. It is not intended to limit the invention to the particular means shown for supporting the front portion of the saddle from the frame.

Figure 1:
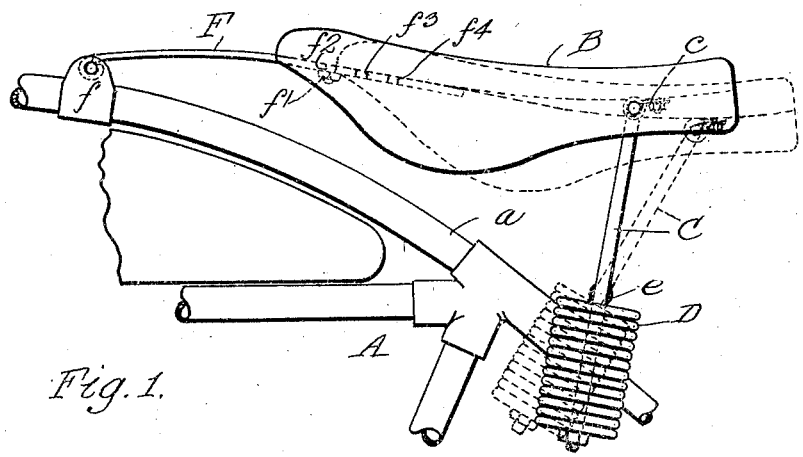
Figure 1 is a side view of a saddle embodying the invention.
Figure 2:
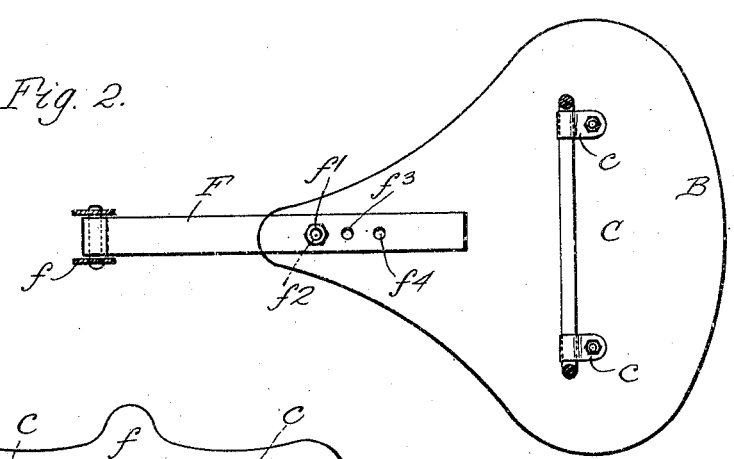
Fig. 2 is a bottom plan view thereof.
Figure 3:
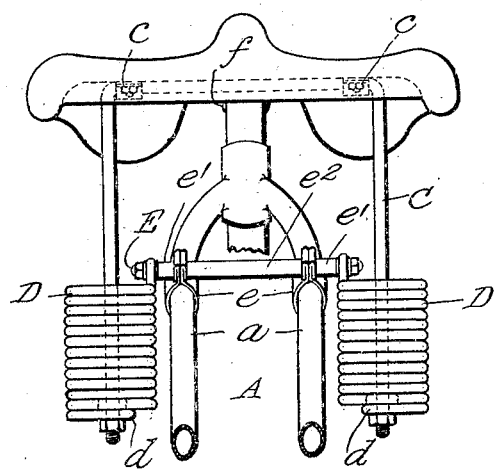
Fig. 3 is a rear elevation thereof.

In order to vary the cushioning effect which the rear springs have upon the saddle B, the saddle and rear springs are made adjustable relatively to each other so that a load supported on the saddle will exert a greater or less strain upon the springs in different positions of the saddle relatively to the springs. This is done in the construction illustrated by changing the position of the saddle with reference to the frame and the rear springs by providing different holes $f^2$, $f^3$ and $f^4$ in the front spring F in which the bolt $f'$ of the saddle may engage. Consequently, when the saddle is in its forward position, as shown in full lines in Fig. 1, the force exerted upon the springs D by a weight on the saddle will be much less than when the saddle is in the rear position shown in dotted lines in Fig. 1. Therefore, if the saddle is to be used by a heavy person, the saddle is placed into the forward position shown in full lines in Fig. 1, in which position the bolt $f'$ engages in the hole $f^2$ in the front spring. The weight of the person upon the saddle does not exert as much force on the rear spring or springs as when the saddle is arranged farther back, for example when the bolt $f'$ is in the hole $f^3$. When the bolt $f'$ is in the hole $f^4$, the saddle will occupy the position shown in dotted lines in Fig. 1, and in this position a weight on the saddle will exert much greater force upon the rear springs than when the saddle is in either of the other positions. Hence, if the saddle is to be used by a light person, the saddle is positioned as indicated in dotted lines in Fig. 1, in which case a lighter load on the saddle will cause practically the same amount of deflection of the springs as would a heavier load when the saddle is in a more forward position.

By means of this construction it is not necessary to change the springs D in accordance with the weight of the person riding the cycle, since the cushioning effect of the springs supporting the saddle can be changed by changing the position of the saddle relatively to the springs. Consequently, by providing the bicycle or motorcycle with a saddle of this kind, in which the spring is made stiff enough to cushion the heaviest weights to be carried by the saddle the cushioning effect of the spring can be easily controlled by placing the bolt $f'$ into one or another of the holes $f^2$ $f^3$ or $f^4$ in the front spring. The adjusting means described add practically nothing to the cost of the saddle and are preferably used, but it is not intended to limit the invention to the particular adjusting means shown, since other means for adjusting the saddle, spring or frame relatively to each other can be used without departing from this invention.

I claim as my invention:—

1. The combination with a cycle frame, of a saddle mounted thereon, a spring operatively connected with the rear portion of said saddle and with said frame, and means for holding said saddle and said spring in different relative positions to vary the force exerted upon said spring by a weight on said saddle.

2. The combination with a cycle frame, of a saddle mounted thereon, a spring secured on said frame and connected with the rear portion of said saddle, and means for securing said saddle in different positions relatively to said spring to vary the force exerted upon said spring by a weight on said saddle.

3. The combination with a cycle frame, of a saddle mounted thereon, a spring for yieldingly supporting the rear portion of said saddle from said frame, a link connecting said spring and the rear portion of said saddle, and means holding said link in various angular relations to said frame and said saddle to vary the force exerted upon said spring by a weight on said saddle.

4. The combination with a cycle frame, of a saddle mounted thereon, a spring interposed between said saddle and said frame, a link connecting said spring and said saddle, said saddle, link and a portion of said frame forming a toggle link mechanism, and means for placing said saddle and link in different angular relations with reference to each other to vary the force exerted on said spring by a weight on said saddle.

5. The combination with a cycle frame, of a saddle having its front end adjustably connected to said frame, a spring for supporting the rear end of said saddle from said frame, and means for adjusting the saddle relatively to the frame to vary the cushioning effect of said spring.

6. The combination with a cycle frame, of a saddle pivotally connected near one end with said frame, a spring connection between the other end portion of said saddle and said frame, said saddle, spring connection and part of said frame forming a toggle link mechanism, and means for changing the angular relation between said saddle, frame and spring connection to vary the force exerted on said spring by a weight on said saddle.

7. The combination with a cycle frame, of a saddle having its front end adjustably connected to said frame, a spring secured to said frame and supporting the rear portion of said saddle, a link connecting said spring and said saddle, and means for varying the angle between said link and said saddle to vary the cushioning effect of said spring.

8. The combination with a cycle frame, of a saddle having its front end adjustably connected to said frame, a spring secured to said frame and supporting the rear portion of said saddle, a link having its lower end secured to said spring and its upper end pivoted on said saddle, and means for holding said saddle in various positions relatively to the frame to vary the cushioning effect of the spring.

9. The combination with a cycle frame, of a saddle, a spring secured to said frame, a link secured to the rear portion of said saddle and to said spring, and adjustable connecting means between the front portion of said saddle and said frame whereby the saddle may be held in various positions relatively to said spring to vary the cushioning effect thereof.

10. The combination with a cycle frame, of a saddle, a spring secured to said frame, a link secured to the rear portion of said saddle and to said spring, a member connecting the front portion of said saddle to said frame, and means for adjustably holding said member on said saddle to vary the cushioning effect of said spring.

11. The combination with a cycle frame, of a saddle, a spring secured to said frame, a link secured to the rear portion of said saddle and to said spring, a member secured to said frame, and a bolt on the front portion of said saddle adapted to enter into one of a plurality of holes in said member for holding said saddle in different positions with regard to said frame to vary the cushioning effect of said spring.

12. The combination with a cycle frame, of a pair of springs, each spring having one end secured to said frame, a substantially inverted U-shaped member hinged on the rear portion of said saddle and the ends of which are connected to the other ends of said springs, and means connecting the front portion of said saddle to the frame, said means being adjustable to vary the relation of said saddle to said springs, whereby the cushioning effects of said springs can be varied.

Witness my hand this 21st day of February, 1920.

LEIGH R. EVANS.

Witnesses:
 A. C. RICE,
 HOWARD F. YOUNG.